No. 792,786. PATENTED JUNE 20, 1905.
J. H. PITKIN.
HAY BALER.
APPLICATION FILED MAR. 31, 1905.
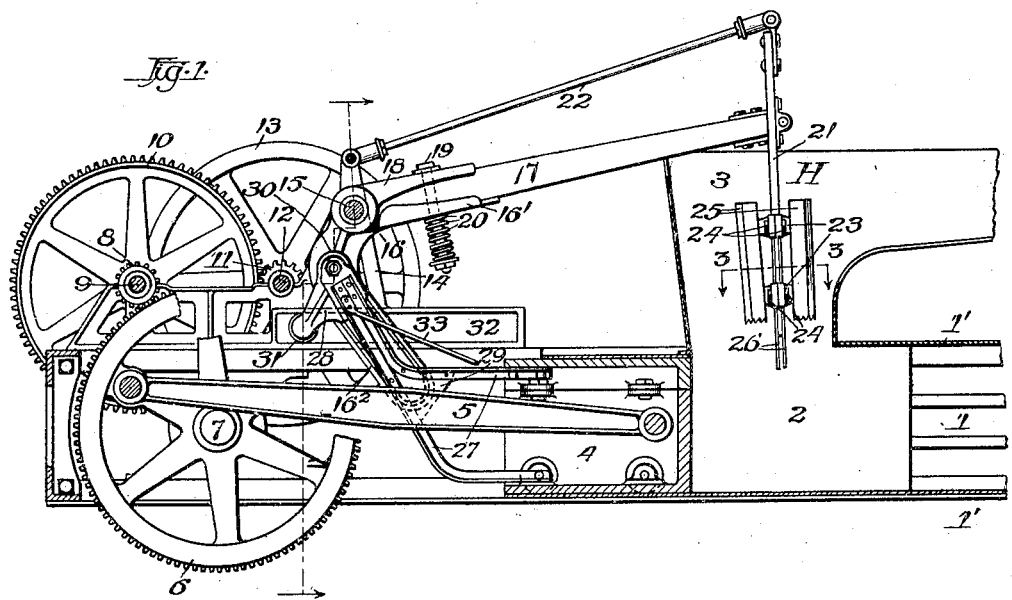
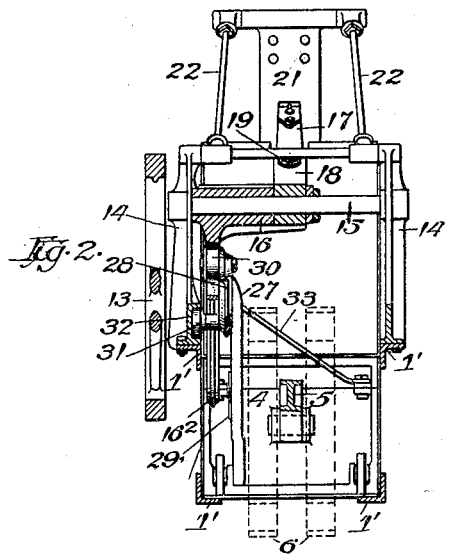
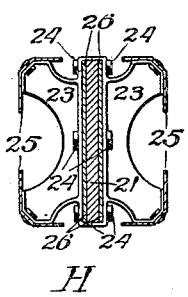
Witnesses:
T. H. Alfreds.
T. N. Daggett.
Inventor
Julian H. Pitkin
By J. C. Varnes,
Attorney.

No. 792,786.

Patented June 20, 1905.

UNITED STATES PATENT OFFICE.

JULIAN H. PITKIN, OF CHICAGO, ILLINOIS, ASSIGNOR TO INTERNATIONAL HARVESTER COMPANY, A CORPORATION OF NEW JERSEY.

HAY-BALER.

SPECIFICATION forming part of Letters Patent No. 792,786, dated June 20, 1905.

Application filed March 31, 1905. Serial No. 253,016.

*To all whom it may concern:*

Be it known that I, JULIAN H. PITKIN, a citizen of the United States, residing at Chicago, in the county of Cook and State of Illinois, have invented a new and useful Improvement in Hay-Balers, of which the following is a complete specification.

This invention relates to hay-presses of the type having a reciprocating plunger and a self-feeding attachment operated by the plunger, its application being herein shown in connection with a power-press.

As ordinarily constructed balers with a feeding device actuated by the plunger prove more or less unsatisfactory because of the fact that the connection between the plunger and feeder would necessarily be made at a position laterally removed with respect to the central longitudinal axis of said plunger. This would result in the plunger-guides being subjected to excessive side strains, which would cause undue wearing.

The object of this improvement is to overcome such difficulty; and to this end the invention provides an auxiliary plunger-guide outside of the chamber in which the plunger reciprocates.

Other minor improvements will also be described, and illustrated in the accompanying drawings, in which—

Figure 1 represents a longitudinal section of the forward end of a baler in which is embodied my invention. Fig. 2 is a transverse section of same, taken on planes as indicated by the broken line 2 2 in Fig. 1; and Fig. 3 is a transverse section of the feeder-head, taken as indicated by the line 3 3 in Fig. 1.

Referring to the drawings, 1 designates the baling-chamber, only a small portion thereof being shown, the upper and lower sills 1' of which form the chief members of the baler-frame.

2 represents the compression-chamber, and 3 the hopper. In the compression-chamber 2 is the reciprocating plunger 4, actuated by the pitman 5, the forward end of which connects with the large gear 6. This gear 6 is secured to the shaft 7 and is driven by means of the pinion 8 on the shaft 9. On the shaft 9 is also secured the large gear 10, meshing with and being driven by the pinion 11 on the driving-shaft 12. To this driving-shaft is secured the fly-wheel 13 and also a driving-pulley. (Not shown.)

Secured to and extending upwardly from both sides of the frame of the baler in a position adjacent to the shaft 12 are the standards 14, in which journals the rock-shaft 15. To this rock-shaft 15 is rigidly secured the feed-lever casting 16, which, in effect, amounts to a bell-crank, 16' being the laterally-offset and forwardly-projecting arm, to which is secured the feed-lever 17, and $16^2$ being the downwardly and forwardly projecting slotted arm which connects with the plunger 4. Sleeved loosely, also, on the rock-shaft 15 and in a position directly above the arm 16' is the arm 18, movable on its shaft independent of the casting 16, with which it coöperates to form a yielding support for the feed-lever 17. Between the arms 16' and 18 the said feed-lever is held by means of the bolt 19, a spring 20 being received upon said bolt to permit the arm 18 and lever 17 to yield upwardly from the arm 16', this latter arm constituting the positive driving element.

To the outer or free end of the feed-lever 17 is pivotally mounted the feeder-head, which may be designated as a whole by H. This head consists of a center board 21, which pivotally connects intermediate of its length with the feed-lever 17 and at its upper end with the feeder-head-controlling bars 22, these controlling-bars having pivotal connection at their lower ends with the upper ends of the standards 14, as clearly shown in Figs. 1 and 2. To the center board 21, near its lower end, are secured the castings 23, arranged in an upper and a lower pair, as shown, and fixed to the center board by means of the bolts 24. To these castings are secured the angle-plates 25, one plate at each corner, so as to leave interrupted spaces extending longitudinally on the faces of said head. The length of the angle-plates 25 is such as to make the length of the feeder-head greater than its transverse dimensions or, in other words, of a greater longitudinal than transverse cross-section.

The above construction of the feeder-head will make it very light and strong and result in its having a comparatively large surface to present to the hay in forcing it into the hopper, while its great length will prevent the hay crowding over the top of said feeder when in its lowest position in the compression-chamber.

The plates 26 are secured to the lower end of the center board 21, are held in place by the castings 23, and made to project down somewhat below the serrated edges of the angle-plates 25, the function of these plates being to initially engage the hay and assist in properly directing it into the compression-chamber.

Inside the plunger 4 and at the top and bottom corners thereof are secured the angle-bars 27, which extend rearward and upwardly, converging and having their ends held rigidly together by means of the casting 28. At the point of meeting the angle-bars are fixed to each other by means of the plate 29. These angle-bars 27 are as one piece with the plunger 4 and, in effect, constitute an arm which extends upwardly and rearwardly therefrom.

The casting 28 has journaled thereon the rollers 30 and 31, the roller 30 engaging the downwardly-projecting slotted arm $16^2$ of the feed-lever casting 16, while the roller 31 is made to engage the auxiliary plunger-guide 32. The auxiliary plunger-guide is formed of a recessed casting, as shown, the recess being of a length substantially equal to the travel of the plunger 4. A brace-rod 33 extends diagonally from the upper ends of the angle-bars 27 to the plunger to securely hold the casting 28 against any lateral movement. While the construction of the auxiliary guide is shown in its preferred form, I do not limit myself to such particular construction, for it is evident the form of the rigidly-constructed plunger extension which engages the auxiliary guide could be made to extend upwardly or laterally in any convenient direction from the longitudinal axis of the plunger to engage an auxiliary guide and its function would remain unchanged. The end in view is to provide supplementary or additional means to counteract the side strains arising from the resistance laterally applied with respect to the plunger which is encountered in driving the feeding mechanism from said plunger. It may be added that the same side strains would result in the plunger even though the feeder connection were to be made with the pitman 5, and hence in such a construction the invention would also be applicable.

In operation the roller 31 will contact the lower flange of the guide 32 when the plunger is moving rearwardly and compressing its charge, this pressure arising from the resistance offered by the raising feed-lever, while in the withdrawal of the plunger a pressure in the reverse direction will result. In this manner all side strains are taken up by means of the roller 31, bearing in the guide 32, and the tipping tendency of the plunger is effectually overcome.

What I claim as my invention, and desire to secure by Letters Patent, is—

1. In a baling-press, in combination, a baling-chamber, a reciprocating plunger operating therein, an oscillating feed-lever, an auxiliary plunger-guide secured to the frame of the press, an upwardly-extending arm secured rigidly to said plunger, said arm engaging said guide and also engaging and actuating the feed-lever.

2. In a baling-press, in combination, a baling-chamber, a reciprocating plunger operating therein, an oscillating feed-lever provided with a downwardly-projecting slotted arm, an auxiliary plunger-guide secured to the frame of the press, an upwardly and rearwardly extending arm fixed to one side of the plunger and two rollers mounted on the upper end of said arm, one of said rollers engaging the downwardly-projecting slotted arm of the feed-lever and the other roller engaging the auxiliary plunger-guide.

3. In a baling-press, in combination, a baling-chamber, a reciprocating plunger operating therein, an oscillating feed-lever provided with a downwardly-projecting slotted arm, an auxiliary plunger-guide secured to the frame of the press, rearwardly and upwardly convergent angle-bars secured to the plunger on one side and near the top and bottom thereof, a casting secured to the upper ends of the angle-bars, two rollers journaled on said casting, one of said rollers engaging the downwardly-projecting slotted arm of the feed-lever and the other roller engaging the auxiliary plunger-guide, and a brace-rod interposed between the upper ends of the angle-bars and the opposite side of the plunger.

4. In a baling-press, in combination, a baling-chamber, a reciprocating plunger operating therein, and a feeding device actuated by said plunger, said feeding device comprising an oscillating feed-lever, a feeder-head-controlling bar, and a feeder-head of a greater longitudinal than transverse section which has pivotal connections with the feed-lever and controlling-bar, the said feeder-head being formed of a center board, longitudinally-disposed angle-plates serrated at their lower edges and secured to said center board by means of suitable castings, and downwardly-projecting plates secured to said center board, the said plates extending below the body of said block.

JULIAN H. PITKIN.

Witnesses:
OSCAR A. ANDERSON,
SIDNEY W. NICHOLLS.